(12) United States Patent
Ballarin et al.

(10) Patent No.: US 11,975,932 B2
(45) Date of Patent: May 7, 2024

(54) GRIPPING AND CARRYING DEVICE FOR MOVING A CONTAINER

(71) Applicant: Volvo Truck Corporation, Gothenburg (SE)

(72) Inventors: Paolo Ballarin, Saint Genis Laval (FR); Fabrice Courtens, Caluire et Cuire (FR)

(73) Assignee: Volvo Truck Corporation, Gothenburg (SE)

( * ) Notice: Subject to any disclaimer, the term of this patent is extended or adjusted under 35 U.S.C. 154(b) by 254 days.

(21) Appl. No.: 17/683,727

(22) Filed: Mar. 1, 2022

(65) Prior Publication Data

US 2022/0315342 A1 Oct. 6, 2022

(30) Foreign Application Priority Data

Mar. 31, 2021 (EP) ..................................... 21305418

(51) Int. Cl.
*B65G 7/12* (2006.01)
*B66C 1/22* (2006.01)

(52) U.S. Cl.
CPC . *B65G 7/12* (2013.01); *B66C 1/22* (2013.01)

(58) Field of Classification Search
CPC .... B65G 7/12; B66C 1/22; B66C 1/34; B66C 1/42; B66C 1/44
USPC ............................... 294/15, 16, 28, 67.2, 106
See application file for complete search history.

(56) References Cited

U.S. PATENT DOCUMENTS

| | | | | |
|---|---|---|---|---|
| 1,541,090 A * | 6/1925 | Yunkes | ..................... | B66C 1/20 294/81.5 |
| 2,358,767 A * | 9/1944 | Breslav | ..................... | B66C 1/24 294/81.5 |
| 2,847,243 A * | 8/1958 | Hare | ................... | H01M 50/256 294/903 |
| 3,103,282 A * | 9/1963 | York | ...................... | B66C 1/447 294/106 |
| 4,109,852 A * | 8/1978 | Brown | .................. | B04B 5/0442 494/84 |
| 5,791,861 A * | 8/1998 | Seelig | .................... | B65G 47/91 294/185 |
| 5,820,180 A * | 10/1998 | Haupt | ...................... | B65G 7/12 294/16 |
| 5,984,612 A * | 11/1999 | Tatro | ......................... | B66C 1/62 294/119.2 |
| 7,997,633 B2 * | 8/2011 | Bahler | ..................... | B65G 7/12 269/228 |

(Continued)

*Primary Examiner* — Paul T Chin
(74) *Attorney, Agent, or Firm* — Withrow & Terranova, PLLC (57) ABSTRACT

A gripping and carrying device for moving a container having a longitudinal axis and a transversal axis where in the device comprises a substantially L-shaped frame extending along the longitudinal axis and connected onto a mobile crane, the frame having a distal end provided with at least one hooking device configured to engage onto at least one complementary hooking device provided on the container and a proximal end provided with a grabbing and gripping deck having grab handles rotationally mounted onto the deck and a gripping device translationally mounted onto the deck, mobile between a releasing position wherein the gripping device are disengaged from the container and a gripping position wherein the gripping device are configured to engage into the container.

19 Claims, 6 Drawing Sheets

(56) References Cited

U.S. PATENT DOCUMENTS 9,004,846 B2 * 4/2015 La Rovere ........... B25J 15/0616
　　　　　　　　　　　　　　　　　　　　414/737

* cited by examiner

GRIPPING AND CARRYING DEVICE FOR
MOVING A CONTAINER

RELATED APPLICATIONS

The present application claims priority to European Patent Application No. 21305418.2, filed on Mar. 31, 2021, and entitled "GRIPPING AND CARRYING DEVICE FOR MOVING A CONTAINER," which is incorporated herein by reference in its entirety.

FIELD OF THE DISCLOSURE

The invention relates to a gripping and carrying device for moving a container, a container, a system for moving a container and a vehicle comprising a mobile crane and the gripping and carrying device.

The invention can be applied in vehicles, such as trucks. Although the invention will be described with respect to a truck, the invention is not restricted to this particular vehicle, but may also be used in other vehicles.

BACKGROUND

In the supply chain of parcels to final customers, it is common that a delivery company takes care of covering most of the distance, for example using heavy-duty vehicles, and store the parcel in a warehouse at the entrance to the city or inside the city. From there, smaller vehicles takes over to distribute the goods. In other words, the supply chain is cut in a long distance delivery bringing parcels to a warehouse and a last mile delivery redistributing the parcels over a shorter distance using smaller vehicles.

Although the most efficient way to transport parcels over long distances is still the use of large vehicles such as heavy-duty vehicles, the last step in the delivery process needs to be improved. Indeed, some cities have already forbidden to deliver parcels using over 3.5 tonnes vehicles. Additionally, the so called last mile delivery increases traffic congestion and environmental problem and can increase greenhouse gases emissions. Moreover, the cost of the last mile delivery is high since the transfer between two vehicles takes times, the logistic for this transfer is not optimized, the traffic in particular in big cities is important and some parking difficulties appear to realize the transfer.

Another solution would be to set up logistic centres to realize the transfer. Nevertheless, the cost of real estate in or near city can be prohibitively high. It is known to rent existing parking areas of privately owned companies to unload the parcels, but beyond the vehicles themselves needing space, additional ground surface is necessary for loading devices such forklifts.

Then, smaller vehicles such as bicycle usually carry one unique or very few parcels, deliver each parcel and goes back and forth to the parking to repeat this operation. However, the productivity of such delivery system is very low.

There is therefore room for improvement in the field the parcel logistics in urban area.

SUMMARY

An object of the invention is to improve the transfer of parcels between different vehicles in different environments without even any specific logistic center, to increase the efficiency during the transfer, to reduce the cost of the last mile delivery and to minimize the traffic congestion while respecting the environment.

The object is achieved by a gripping and carrying device for moving a container having a longitudinal axis and a transversal axis, said device comprises a substantially L-shaped frame extending along the longitudinal axis and configured to be connected onto a mobile crane, said frame having a distal end provided with the at least one hooking means configured to engage onto at least one complementary hooking means provided on the container and a proximal end provided with a grabbing and gripping deck having:

grab handles rotationally mounted onto said deck, said grab handles being mobile between a first position and a second position, gripping device translationally mounted onto said deck, mobile between a releasing position wherein the gripping device are disengaged from the container and a gripping position wherein the gripping device are configured to engage into the container, the grab handles and the gripping device being operatively connected within said deck so that a rotation of the grab handles from the first position to the second position causes a translation of the gripping device from the releasing position to the gripping position.

By the provision of a gripping and carrying device for moving a container, the transfer of the parcels can be realized in different environments such as near a logistic hub or a parking. The last mile delivery can be performed by smaller vehicles such as cargo vehicles. The gripping and carrying device of the present invention is easy to manipulate by a single person and offers an optimized logistic flexibility and an increase of the productivity. Indeed, in addition to the fact that thanks to this device, the transfer can be performed in different environments, the device allows a quick transfer of the parcels from a heavy vehicle to a smaller vehicle without the need of a specific infrastructure. Additionally, the device is safe and easy to use. Then, the gripping device and the grab handles cooperate together to facilitate the gripping of the container on the device. Thus, the device can easily be manipulated by a user without an excessive effort. Finally, the device does not increase the traffic in cities and guarantees the respect of the environment.

In a preferred embodiment, the grab handles rotate from the first position to the second position with an angle α between 0 and 100° with respect to the transversal axis. In this embodiment, the grab handles are easily adapt by the user to correctly place the device on the container with a minimum effort performed by the user.

According to one embodiment, the grab handles comprise each a parallelogram structure having a grabbing rod and two parallel connecting rods connecting the grabbing rod to the deck via four rotatory spring linkage maintaining the grab handle in a third position where the grabbing rod is parallel to the deck and allowing the grab handle to move to a fourth position where the grabbing rod rotate with respect to the longitudinal axis while remaining parallel to the deck. In a preferred embodiment, the grab handles rotate with an angle β between 0 and 160° with respect to the transversal axis. In this embodiment, the gripping device are easily adapted by the user to correctly place the device on the container with a minimum effort performed by the user.

According to one embodiment, the grab handles are operatively connected to the gripping device by connecting means of one or more of the group including electric actuators, pneumatic actuators, hydraulic actuators, connecting rods and cables.

According to one embodiment, the grab handles are connected together through the frame mechanically or electrically. In a preferred embodiment, the grab handles are connected together through the frame mechanically using rods or cables. Alternatively, the grab handles are connected together through the frame mechanically using an electric motor.

According to one embodiment, the frame comprises telescopic means along the longitudinal axis of the gripping and carrying device.

According to one embodiment, the grab handles comprise independently from each other an operating interface. In this embodiment, the grab handles are controlled by the operating interface.

According to one embodiment, the gripping and carrying device is made of die cast metal or plastic.

According to one embodiment, for safety reasons, the device comprises warning means alerting the user if there is a risk that the container is not firmly attach to the device. For example, the warning means comprises a sound alert and/or a visual warning.

According to a second aspect of the invention, the object is achieved by a container configured to cooperate with the device according to the present invention, said container comprising grooves configured to receive the gripping device.

According to one embodiment, the container comprises an upper wall, a lower wall and lateral walls, said lateral walls comprising the grooves.

According to one embodiment, the container comprises at least a complementary hooking means configured to be engaged into the at least hooking means of the frame. For example, the at least complementary hooking means is located on the container upper wall. This embodiment guarantees that the container is firmly locked by the device.

According to one embodiment, the at least complementary hooking means is located on the container upper wall.

According to one embodiment, the upper wall of the container is inclined. In this embodiment, the user has a better view of the locking of the container on the device.

According to one embodiment, the container comprises guiding means configured to receive vehicle complementary guiding means or trailer complementary guiding means. For example, the guiding means are located in the lateral and/or the upper wall of the container. In this embodiment, the container is safely locked to the vehicle or a trailer of the vehicle limiting the risk of falling.

According to one embodiment, the container further comprises stacking means configured to stack other containers. For example, the stacking means are located in the top and/or upper wall of the container. In this embodiment, all the containers are safety locked together limiting the risk of falling.

According to one embodiment, the container comprises an inner housing including movable partition walls. In this embodiment, the container is easily adaptable depending on the dimensions of the parcels.

For example, the container can be made of a rigid material to support the heavy parcels. For example, the outer housing of the container is waterproof to resist to bad weather.

According to a third aspect of the invention, the object is achieved by a system for moving a container comprising the gripping and carrying device according to the present invention and the container according to the present invention.

According to a fourth aspect of the invention, the object is achieved by a vehicle comprising a mobile crane and the gripping and carrying device according to the present invention, said gripping and carrying device being linked to the crane through an electrical harness. By using said vehicle, the crane is aligned with the gripping device allowing a correct balancing of the weight. For example, the electrical harness is controlled with a switchbox.

According to one embodiment, the vehicle comprises complementary guiding means configured to be engaged into the guiding means of the container. In this embodiment, the container is safely locked to the vehicle limiting the risk of falling.

According to one embodiment, the vehicle comprises a trailer configured to receive a container according to the present invention.

According to one embodiment, trailer comprising racks comprises complementary guiding means configured to be engaged into the guiding means of the container. In this embodiment, the container is safely locked to the trailer of the vehicle limiting the risk of falling.

According to one embodiment, the vehicle or the trailer comprises batteries to load the crane.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

As illustrated in FIGS. 1 to 4, the gripping and carrying device 1 for moving a container 2 has a longitudinal axis $A_L$ and a transversal axis $A_T$. The device 1 comprises a substantially L-shaped frame 11 extending along the longitudinal axis $A_L$ and configured to be connected onto a mobile crane 3. The frame 11 has a distal end provided with a hooking means 12 configured to engage onto a complementary hooking means 21 provided on the container and a proximal end provided with a grabbing and gripping deck 13.

The grab handles 14 are rotationally mounted onto said deck 13, said grab handles 14 being mobile between a first position and a second position. Preferably, the grab handles 14 rotate from the first position to the second position with an angle α between 0 and 100° with respect to the transversal axis $A_L$.

The gripping device 15 are translationally mounted onto said deck 13, mobile between a releasing position wherein the gripping device 15 are disengaged from the container 2 and a gripping position wherein the gripping device 15 are configured to engage into the container 2.

The grab handles 14 and the gripping device 15 are operatively connected within said deck 13 so that the rotation of the grab handles 14 from the first position to the second position causes a translation of the gripping device 15 from the releasing position to the gripping position. The grab handles 14 and the gripping device 15 can be suitably connected by connecting means offering a rotational degree of freedom to the grab handles 14 and a transversal degree of freedom for the gripping device 15.

As illustrated in FIGS. 1, 2, 5, 6, 8 and 11, the grab handles 14 comprise a parallelogram structure having a grabbing rod 14a and two parallel connecting rods 14b connecting the grabbing rod 14a to the deck 13 via four rotatory spring linkage (not illustrated) maintaining the grab handle 14 in a third position where the grabbing rod 14a is parallel to the deck 13 and allowing the grab handle 14 to move to a fourth position where the grabbing rod 14a rotates with respect to the longitudinal axis $A_L$ while remaining parallel to the deck 13. Preferably, the grab handles 14 can rotate with an angle β between 0 and 160° with respect to the transversal axis.

Figure 1:
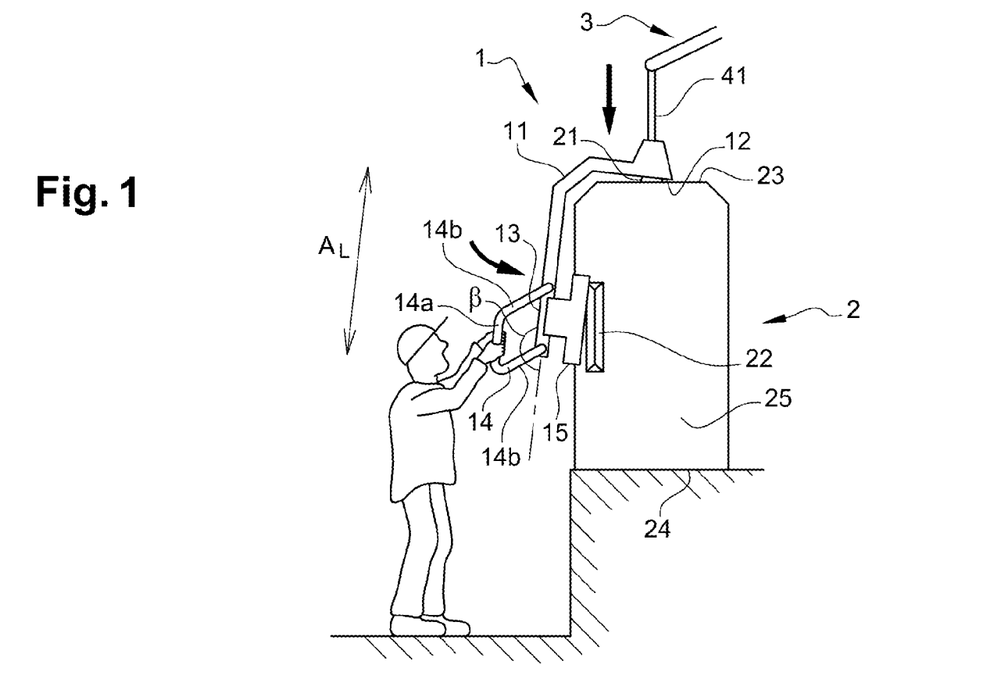
FIG. 1 is view of a system for moving a container according to the present invention.
Figure 2:
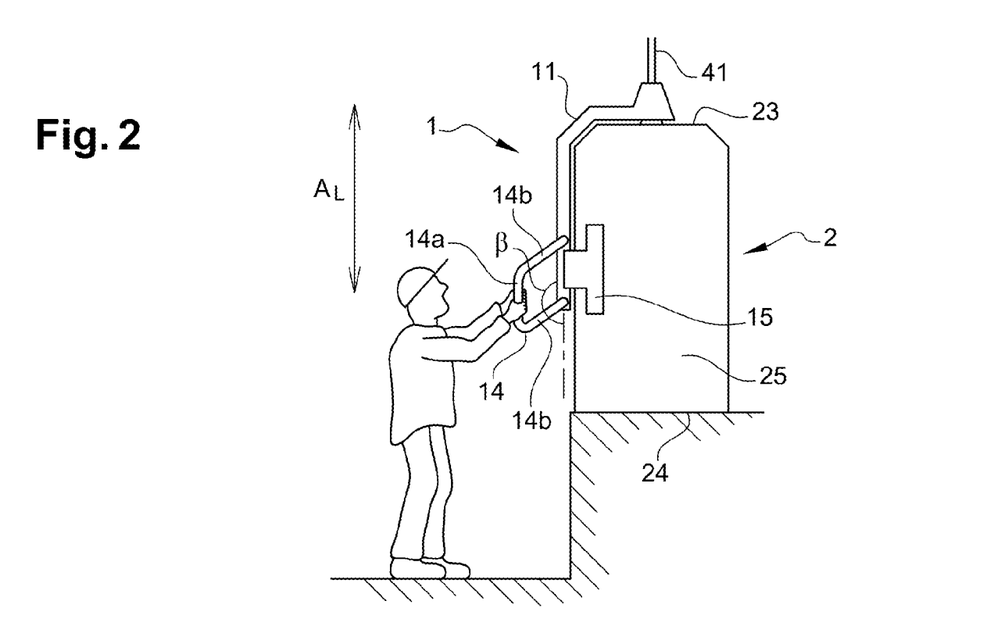
FIG. 2 is view of a system for moving a container according to the present invention.
Figure 3:
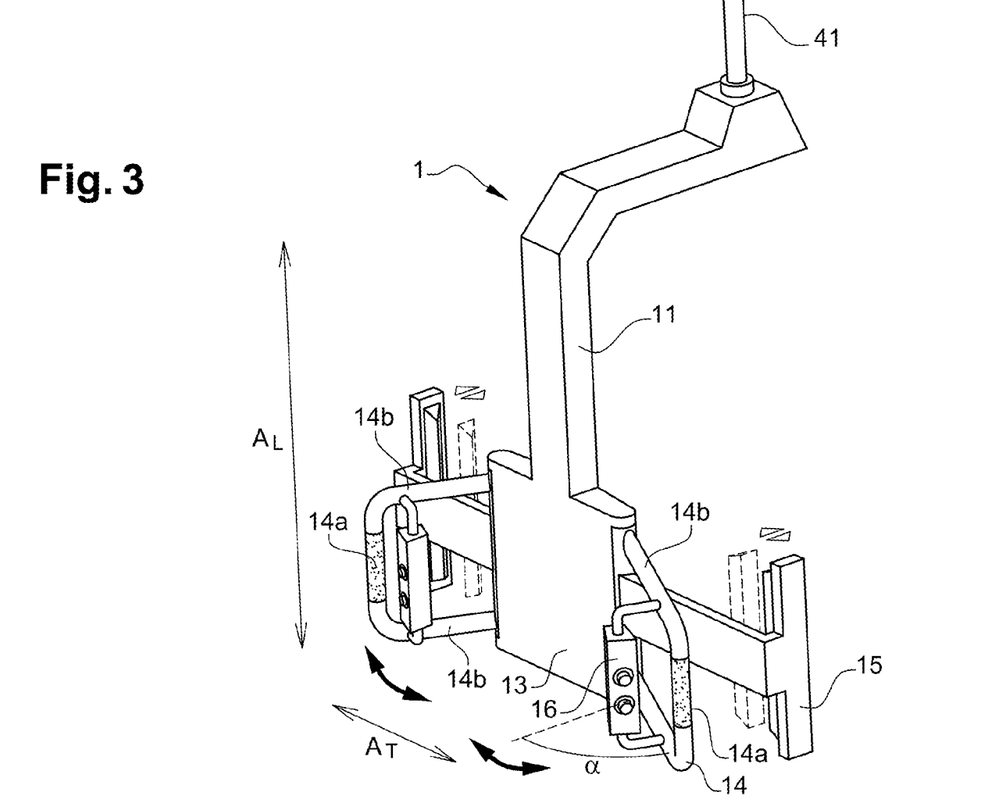
FIG. 3 is view of a gripping and carrying device according to the present invention.
Figure 4:
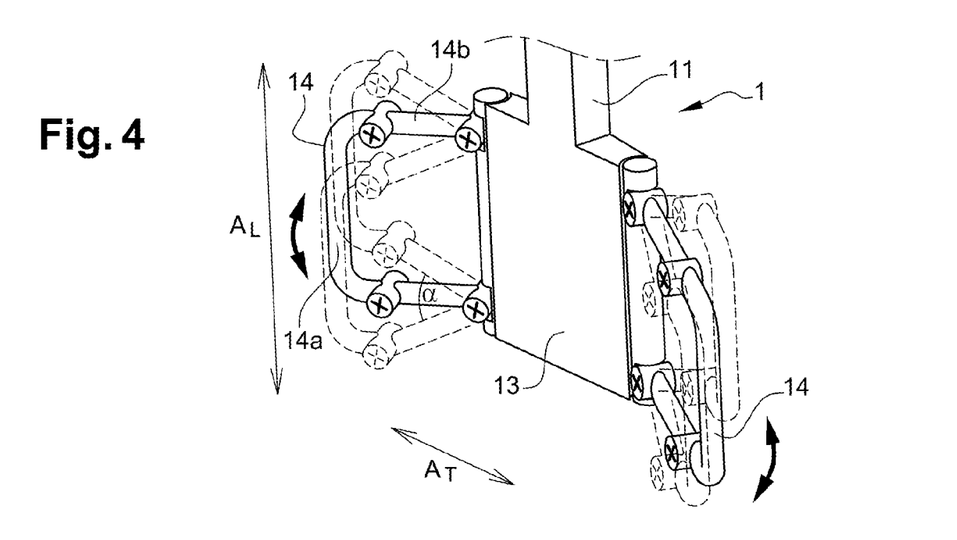
FIG. 4 is view of the grab handles of the gripping and carrying device according to the present invention.
Figure 5:
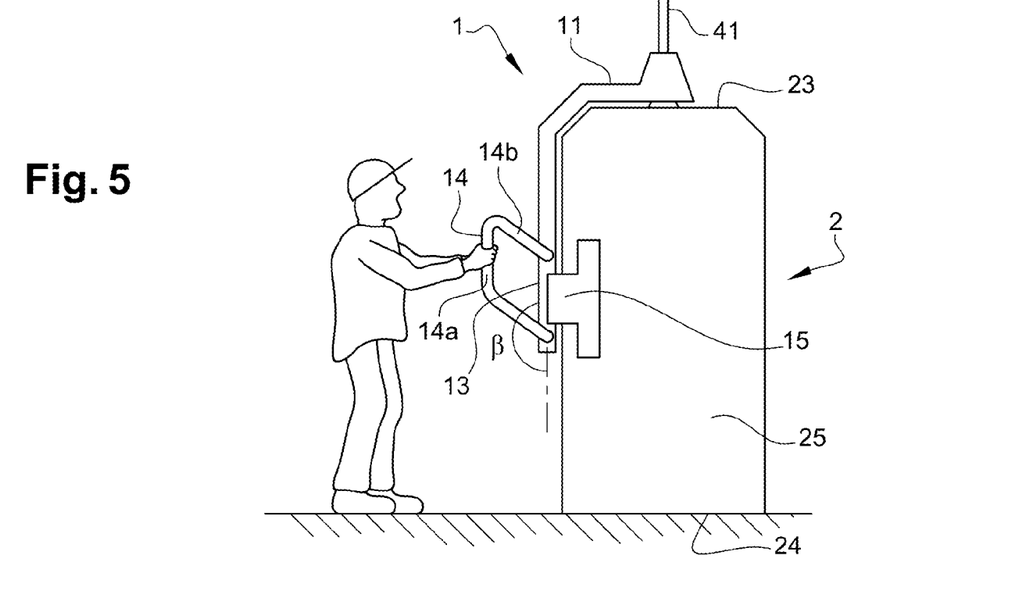
FIG. 5 is view of a system for moving a container according to the present invention.
Figure 6:
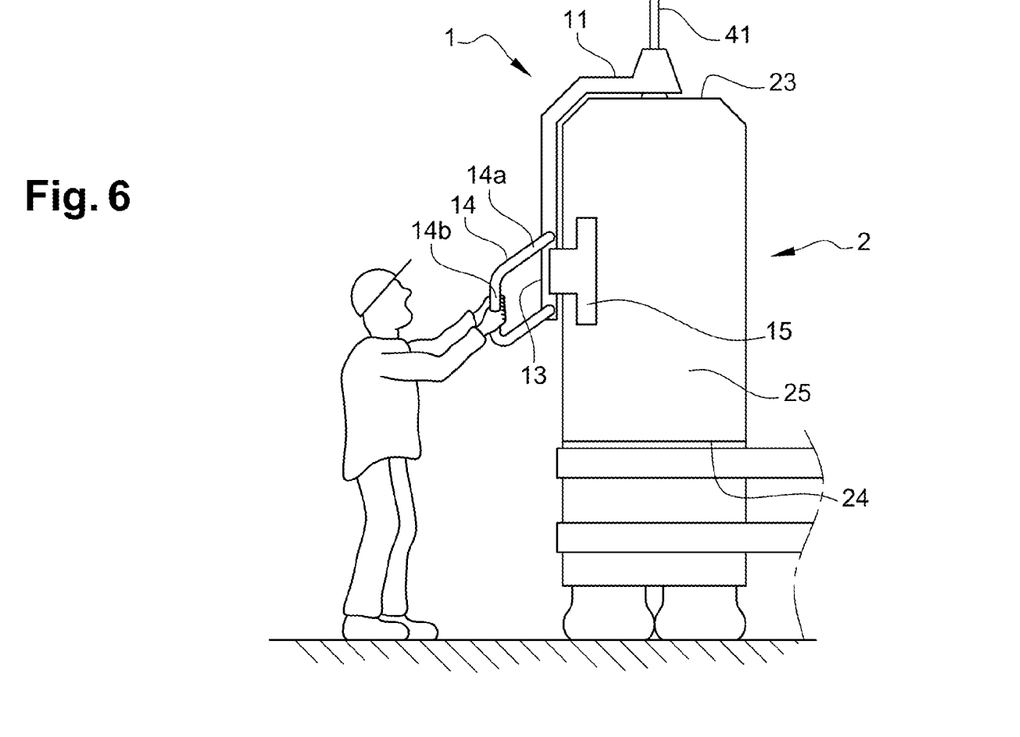
FIG. 6 is view of a system for moving a container according to the present invention.
Figure 7:
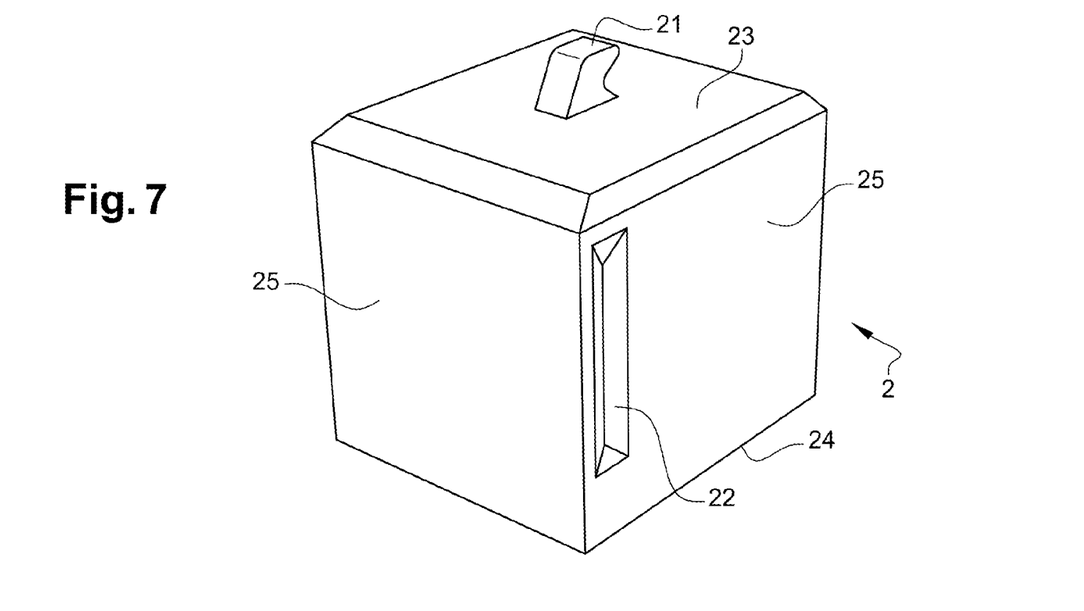
FIG. 7 is view of a container according to the present invention.
Figure 8:
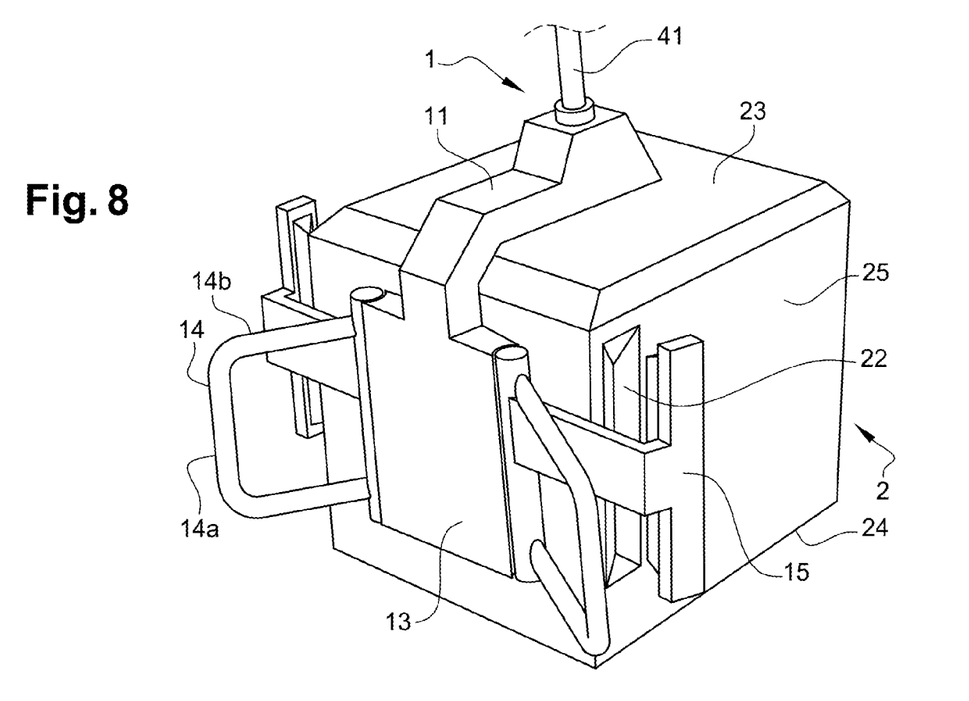
FIG. 8 is view of a system for moving a according to the present invention.
Figure 9:
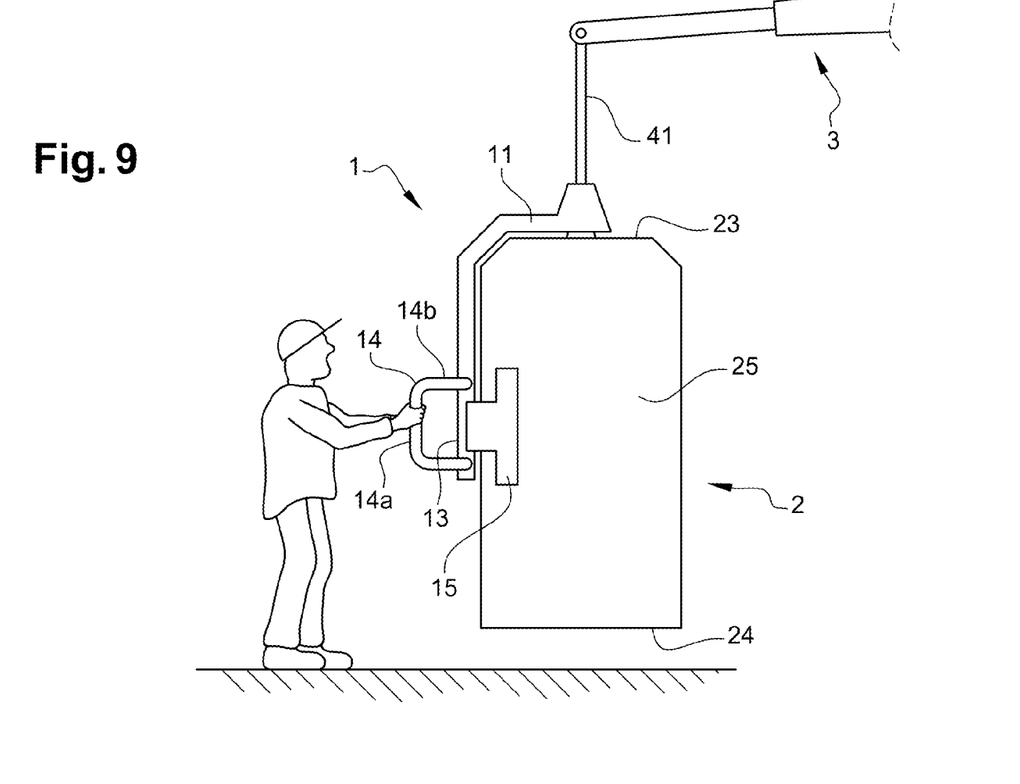
FIG. 9 is view of a system for moving a container comprising the gripping and carrying device according to the present invention and the container according to the present invention.
Figure 10:
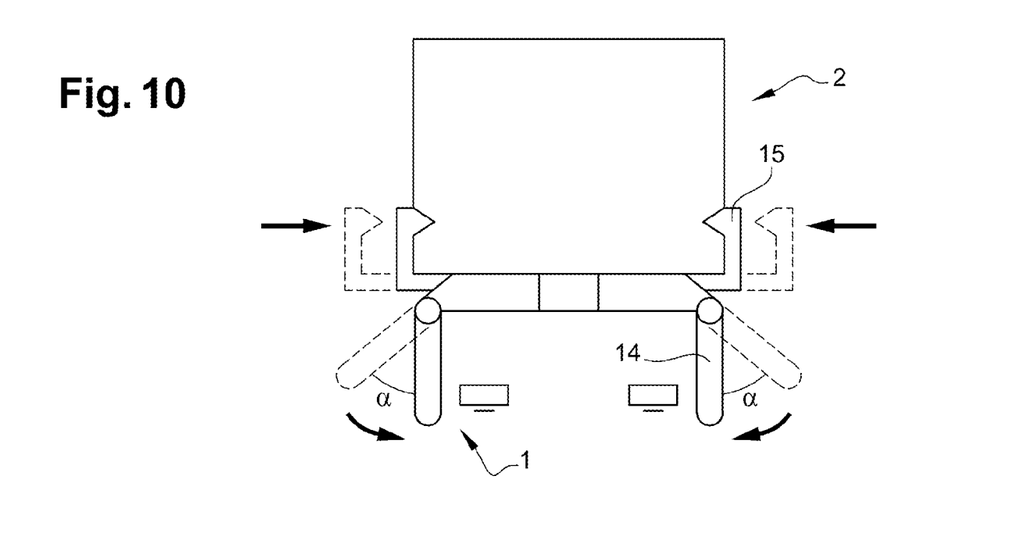
FIG. 10 is top view of a system for moving a container according to the present invention.

In different embodiments of the invention:
  the grab handles 14 are operatively connected to the gripping device 15 by connecting means by a ball-and-socket connection type to provide at least two degrees of freedom. Connection may include a locking device to lock is in a steady position.
  the grab handles 14 are connected together through the frame 11 mechanically using rods or cables.
  the grab handles 14 comprise independently from each other an operating interface 16 (FIG. 3).

The frame 11 can comprise telescopic means (not illustrated) along the longitudinal axis $A_L$ of the gripping and carrying device 1 to adjust to container of different dimensions.

FIGS. 1, 2, 5, 6, 7, 9, 10 and 11 illustrate a container 2 configured to cooperate with the device 1. Said container 2 is provided with grooves 22 configured to receive the gripping device 15. For example, the container 2 comprises an upper wall 23, a lower wall 24 and lateral walls 25, said lateral walls comprising the grooves 22. Preferably, the complementary locking means 21 is located on the container upper wall 23.

Figure 11:
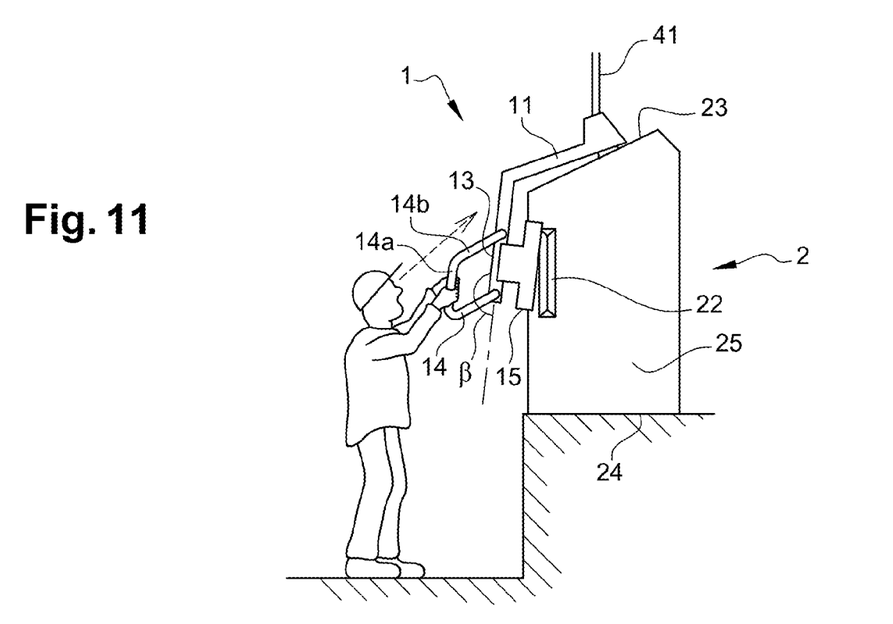
FIG. 11 is view of a system for moving a container according to the present invention and FIG. 12 is view of a vehicle comprising a mobile crane and the gripping and carrying device, according to the present invention.

FIG. 11 illustrates an example wherein the upper wall 23 of the container 2 is inclined so that the user has a better view of the locking of the container 2 on the device 1.

Figure 12:
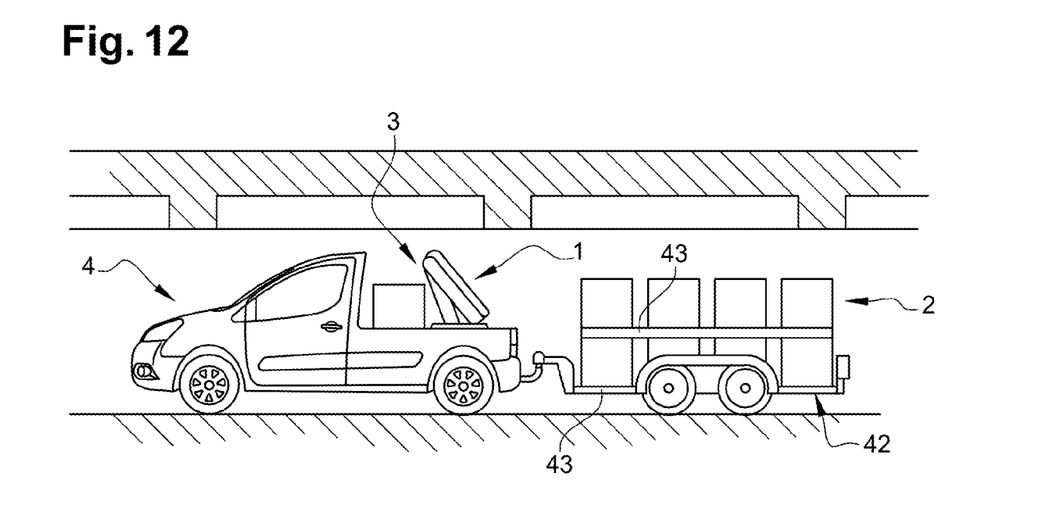

FIG. 12 illustrates a vehicle 4 comprising a mobile crane 3 and the gripping and carrying device 1. The gripping and carrying device 1 is linked to the crane 3 through an electrical harness 41. In the illustrated embodiment, the vehicle 4 comprises a trailer 42 configured to receive containers 2 for example located in an underground parking having a limited height of 1.9 m.

The trailer 42 comprises racks 43 comprising complementary guiding means configured to be engaged into the guiding means of the container (not illustrated).

By using the system of the present invention, the supply chain of notably parcels is optimized, in particular the last mile delivery. The transfer of parcels from a heavy-duty vehicle to a smaller vehicle can be performed in different environments. The system is optimized notably concerning the traffic and the environment issues. Additionally, this easy-to-use system increases the productivity of the deliveries while being safe for the user. Thus, the efficiency of the supply chain is improved.

It is to be understood that the present invention is not limited to the embodiments described above and illustrated in the drawings; rather, the skilled person will recognize that many changes and modifications may be made within the scope of the appended claims.

The invention claimed is:

1. A gripping and carrying device for moving a container comprising:
  a longitudinal axis, and
  a transversal axis,
  wherein the device comprises:
    a substantially L-shaped frame extending along the longitudinal axis and configured to be connected onto a mobile crane, the frame having a distal end provided with at least one hooking means configured to engage onto at least one complementary hooking means provided on the container and a proximal end provided with a grabbing and gripping deck having:
      grab handles rotationally mounted onto the deck, the grab handles being mobile between a first position and a second position, and
      a gripping device translationally mounted onto the deck, mobile between a releasing position wherein the gripping device are disengaged from the container and a gripping position wherein the gripping device are configured to engage into the container,
    the grab handles and the gripping device being operatively connected within the deck so that a rotation of the grab handles from the first position to the second position causes a translation of the gripping device from the releasing position to the gripping position.

2. The device of claim 1, wherein the grab handles each comprise a parallelogram structure comprising:
  a grabbing rod, and
  two parallel connecting rods connecting the grabbing rod to the deck via four rotatory spring linkage maintaining the grab handle in a third position,
  wherein the grabbing rod is parallel to the deck and allows the grab handle to move to a fourth position where the grabbing rod rotates with respect to the longitudinal axis while remaining parallel to the deck.

3. The device of claim 2, wherein the grab handles are operatively connected to the gripping device by one or more of a group including electric actuators, pneumatic actuators, hydraulic actuators, connecting rods, and cables.

4. The device of claim 1, wherein the grab handles are operatively connected to the gripping device by one or more of a group including electric actuators, pneumatic actuators, hydraulic actuators, connecting rods, and cables.

5. The device of claim 1, wherein the grab handles rotate from the first position to the 10 second position with an angle between 0 and 100° with respect to the transversal axis.

6. The device of claim 2, wherein the grab handles rotate with an angle between 0 and 160° with respect to the transversal axis.

7. The device of claim 1, wherein the frame comprises telescopic means along the longitudinal axis of the gripping and carrying device.

8. The device of claim 7, wherein the grab handles each comprise a parallelogram structure comprising:
   a grabbing rod, and
   two parallel connecting rods connecting the grabbing rod to the deck via four rotatory spring linkage maintaining the grab handle in a third position,
   wherein the grabbing rod is parallel to the deck and allows the grab handle to move to a fourth position where the grabbing rod rotates with respect to the longitudinal axis while remaining parallel to the deck.

9. The device of claim 7, wherein the grab handles are operatively connected to the gripping device by one or more of a group including electric actuators, pneumatic actuators, hydraulic actuators, connecting rods, and cables.

10. The device of claim 7, wherein the grab handles rotate from the first position to the second position with an angle between 0 and 100° with respect to the transversal axis.

11. The device of claim 1, wherein each of the grab handles comprises an operating interface.

12. A container configured to cooperate with the gripping and carrying device of claim 1, the container comprising grooves configured to receive the gripping device.

13. The container of claim 12, comprising:
   an upper wall,
   a lower wall, and
   lateral walls,
   wherein the lateral walls comprise the grooves.

14. The container of claim 13, wherein the upper wall of the container is inclined.

15. The container of claim 12, wherein the container comprises at least a complementary hooking device configured to be engaged into the at least one hooking device of the frame.

16. The container of claim 15, wherein the at least one complementary hooking device is located on the container upper wall.

17. A system for moving a container comprising the gripping and carrying device of claim 1 and a container configured to cooperate with the gripping and carrying device, the container comprising grooves configured to receive the gripping device.

18. A vehicle comprising a mobile crane and the gripping and carrying device of claim 1, the gripping and carrying device being linked to the mobile crane through an electrical harness.

19. The vehicle of claim 18, wherein the vehicle comprises a trailer configured to receive the container.

* * * * *